United States Patent

Munse

[11] 3,937,120

[45] Feb. 10, 1976

[54] DRILL SCREW

[75] Inventor: Robert A. Munse, Troy, Mich.

[73] Assignee: Microdot Inc., Greenwich, Conn.

[22] Filed: Jan. 28, 1975

[21] Appl. No.: 544,744

[52] U.S. Cl. .................................................. 85/47
[51] Int. Cl.² ................................................ F16B 25/00
[58] Field of Search ............. 85/41, 47; 10/10 R; 408/230, 229, 228, 227

[56] References Cited
UNITED STATES PATENTS

| | | | |
|---|---|---|---|
| 3,079,831 | 3/1963 | Gutshall | 85/47 |
| 3,125,923 | 3/1964 | Hanneman | 85/47 |
| 3,395,603 | 8/1968 | Skierski | 85/47 |
| 3,789,725 | 2/1974 | Lindstrom | 85/47 |

Primary Examiner—Ramon S. Britts
Attorney, Agent, or Firm—Harness, Dickey & Pierce

[57] ABSTRACT

A thread forming screw is disclosed having a pilot-drilling tip in which two longitudinal flutes are provided with generally flat and substantially coplanar radial walls defining side cutting edges. Forwardly inclined end portions of said walls terminate in end cutting edges displaced on opposite sides of said plane. The end cutting edges are backed by substantially flat receding walls. The side cutting edges are backed by convexly curved walls.

5 Claims, 4 Drawing Figures

DRILL SCREW

BACKGROUND OF THE INVENTION

Threaded screw fasteners for high-production assembly are in some instances provided with integral pilot drilling tip or entering portions so designed that the screw will drill its own pilot hole in the work and then form and/or cut threads in the work as it is driven home to the final holding position by a suitable rotary driving tool. Such screws may be formed by pinching and rolling dies, for example in the manner disclosed in U.S. Pat. to Skierski, No. 3,550,255, granted Dec. 29, 1970. Said patent, and related Skierski U.S. Pat. No. 3,395,603, granted Aug. 6, 1968 also disclose a drill screw formed in the indicated manner.

The overall objective of the present invention is to provide an improved drill screw adapted to be formed by pinching and rolling processes, which provides high strength, and which is installable with relatively low driving torque.

Other objects and advantages will become apparent upon consideration of the present disclosure in its entirety.

BRIEF DESCRIPTION OF THE FIGURES OF DRAWING

DETAILED DESCRIPTION OF THE PREFERRED FORM OF THE INVENTION

Figure 1:
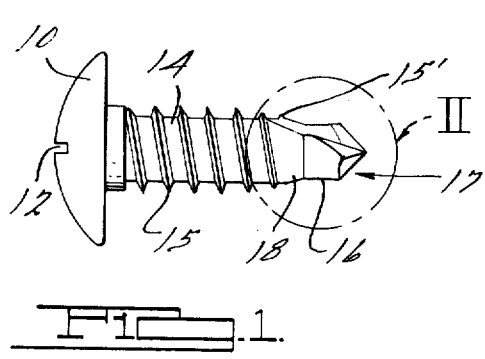
FIG. 1 is a side elevational view of a drill screw constructed in accordance with the present invention.

As shown in FIG. 1, the screw fastener includes a conventional head 10 having a driving slot 12 and a cylindrical shank 14. The shank carries projecting threads 15 adapted to form threads in the work. Such parts may, as is well known, be formed by conventional cold heading and rolling techniques which form no part of the present invention and the details of which are of course subject to variation.

At the entering end the shank includes a straight drilling tip portion generally designated 16 which is of somewhat less diameter than the root diameter of the threads, having a pointed free end 17, and at its other end is joined to the shank by a tapered intermediate portion 18.

A pair of diametrically opposed flute areas generally designated 20, 21 are formed in the portions 16, 17, 18 and extend a short distance into the shank area, intersecting the starting threads 15'. The entering end portion 17 has suitably inclined cutting edges 22, 23. The inclination of cutting edges 22, 23 may be governed by the material to be drilled, as is well known in the drilling art. Rearward continuations of the end cutting edges 22, 23 constitute side cutting edges and extend longitudinally of the portions 16 and 18, such side cutting portions being designated 25, 26.

A generally flat and substantially radially positioned longitudinal front wall 30, 31 extends inwardly from each of the side cutting edges 25, 26 to define a chip-receiving space. The walls 30, 31 are of gradually increasing width toward the tip, and in an area near the end cutting edge are joined to extension wall portions 32, 33 which are inclined forwardly in the direction of rotation. The extension wall portions 32, 33 terminate at the end cutting edges 22, 23 respectively. The wall portions 30, 31 are in an axial plane, but by reason of the forward inclination of the walls 32, 33, it will be seen that each of the end cutting edges 22, 23 is displaced forwardly, in a peripheral or angular sense, in the direction of rotation, from a diametric axial plane parallel to such edges. Such a plane, corresponding to the plane of wall portions 30, 31, is indicated in broken lines at 35 in FIG. 3. The effectiveness of the cutting action is enhanced both by the slope of the walls 32, 33 and by the forward displacement of the end cutting edges 22, 23.

Extending angularly rearwardly from each end cutting edge 22, 23 is a substantially flat relief land 36, 37 which is sloped so as to be out of contact with the work during normal drilling operations, but the slope is relatively gradual in order to provide the maximum strength and backing for the cutting edges. It will be recognized that the actual inclination of the surfaces 32, 36 and 33, 37 may be varied in accordance with the nature of the material to be drilled. In the regions between the flat lands 36, 37 and the wall portions 30, 32 and 31, 33 convexly curved joining wall portions 40, 41 are provided which are of decreasing radius in the rearward angular direction. Wall portions 40, 41 provide additional backing to the end cutting edges 22, 23. In the straight entering portion 16 and tapered intermediate portion 18 the side cutting edges 25 are joined to the opposed flute wall portions 30, 31 by convexly curved backup wall portions 42, 43 of decreasing radius in the rearward angular direction, so that such wall portions do not contact the work during normal drilling operations.

Figure 4:
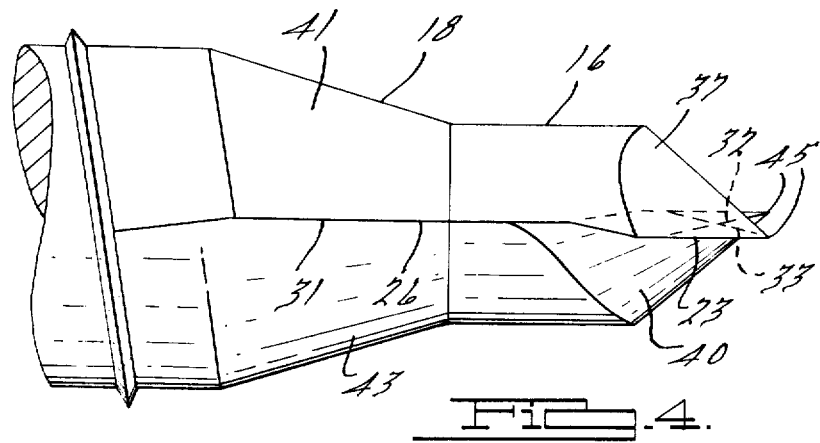
FIG. 4 is a side elevational view at 90° to FIG. 2, looking in the direction indicated by the arrow IV in FIG. 2.

By reason of the forward displacement of the end cutting edges 22, 23, such edges tend during formation of the screw to separate at their tips in the region of the axis, so as to provide pointed tips, designated 45 in FIG. 4. If the metal from which the screw blank is formed does not separate between such tip regions during forming of the screw, however, it stretches so as to define a thin web extending therebetween. In either event the tip region forms a highly effective initial drilling point.

Figure 3:
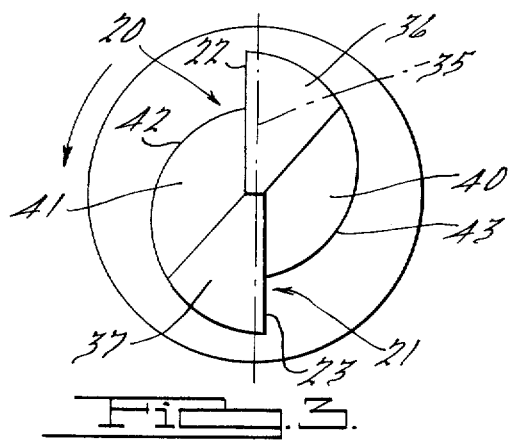
FIG. 3 is an end elevational view taken as indicated by the arrow III in FIG. 2.
Figure 2:
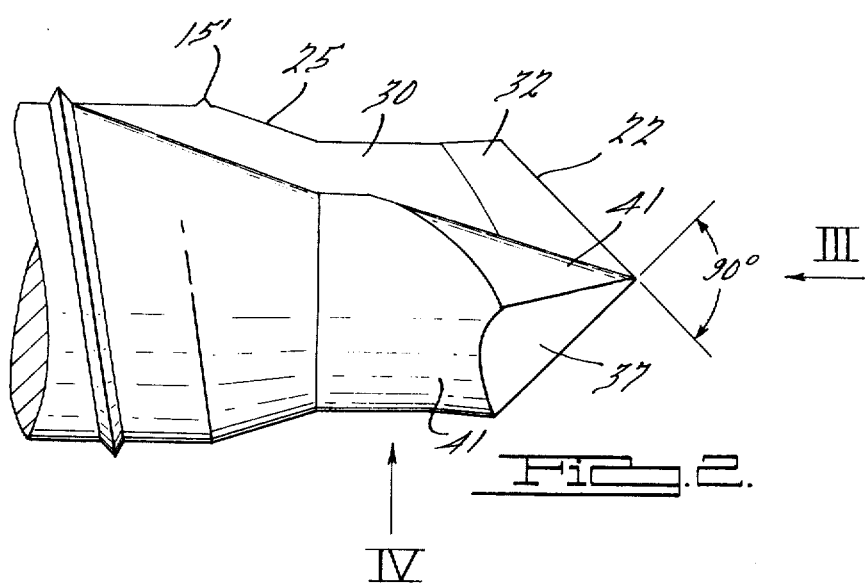
FIG. 2 is an enlarged side elevational view of the portion contained within the circle II in FIG. 1.

It will be appreciated that references herein to angularly forward and rearward directions refer to the direction of rotation of the screw during insertion, which is indicated by the arrow in FIG. 3, while axial directions are considered forward as toward the pointed end, and vice versa.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A drill screw having a driving head and a threaded, threading shank, characterized by a drilling tip having flutes bounded on one side by generally flat longitudinal front wall portions axially spaced from the free end of said drilling tip and located substantially on a common diametric plane, the radially outer margins of said wall portions defining longitudinal side cutting edges extending parallel to the axis of the screw, and flat extension wall portions joined to said front wall portions and extending axially therefrom to the free end of said tip and inclined forwardly in the direction of rotation and having end margins defining end cutting edges which throughout their entire length are displaced angularly forwardly from said diametric plane in the direction of rotation and lie on a plane parallel to such axis.

2. A drill screw as defined in claim 1 further characterized in that said drilling tip includes a pointed end having said extension wall portions and end cutting edges thereon, and substantially flat relief wall portions on said pointed end extending rearwardly from said end cutting edges at an angle to the longitudinal axis of the screw and also inclined rearwardly in the direction of rotation with respect to a plane perpendicular to the longitudinal axis of the screw, each of said flat relief wall portions having a rear margin spaced angularly rearwardly from the end cutting edge and joined to the flat wall portion which lies angularly rearwardly thereof by a convex wall which is of graduatedly decreasing radius in the direction of rotation.

3. A drill screw having a driving head and a threaded, threading shank, characterized by a drilling tip having flutes bounded on one side by longitudinal front walls spaced from the free end of said drilling tip and extending substantially radially, and extension wall portions extending axially and angularly forwardly from the forward ends of said walls to said tip and inclined angularly forwardly from said forward ends in the direction of rotation, the forward margin of each of said extension portions comprising an end cutting edge and lying angularly forwardly in the direction of rotation throughout its entire length with respect to a single common diametric plane.

4. A drill screw as defined in claim 3 further characterized in that said drilling tip includes a pointed end having said extension wall portions and end cutting edges thereon, and substantially flat relief wall portions on said pointed end extending rearwardly from said end cutting edges at an angle to the longitudinal axis of the screw and also inclined rearwardly in the direction of rotation with respect to a plane perpendicular to the longitudinal axis of the screw.

5. A drill screw as defined in claim 4 wherein said flat relief wall portions have an angularly rear margin joined to the flat wall portion which lies angularly rearwardly thereof by a convex wall which is of graduatedly decreasing radius in the direction of rotation.

* * * * *